United States Patent Office 3,207,636
Patented Sept. 21, 1965

3,207,636
METHOD FOR COATING SILICON STEEL TRANSFORMER SHEETS AND COMPOSITION
Toshiya Wada, Tobata, and Koji Yoshino, Kaneo Akanuma, and Satoru Taguchi, Yawata, Japan, assignors to Yawata Iron & Steel Co., Ltd., Tokyo, Japan, a corporation of Japan
No Drawing. Filed June 26, 1962, Ser. No. 205,196
12 Claims. (Cl. 148—6.16)

This invention relates to a method of producing an insulating coating wherein the surface of an electrical sheet is coated with a coating solution and is then heated to bake the coating so that a coating high in the space factor, adhesiveness, workability, layer resistance, anticorrosiveness and paint depositability may be easily and cheaply obtained.

The present invention shall be explained in the following with reference to silicon steel sheets containing not more than 5% silicon.

The electrical insulating coating of silicon steel sheets is required to be high in the layer resistance, anticorrosiveness, space factor, adhesiveness and workability. Phosphoric acid is conventionally used as one of basic compounds for forming such electrical insulating film. However, the coating with only phosphoric acid is not sufficiently high in the layer resistance, space factor, adhesiveness and heatproofness. Therefore, if a coating is made by using a solution prepared by adding a compound containing hexavalent chromium as chromic anhydride to a phosphoric acid solution, a film sufficiently high in the adhesiveness and hard to peel off will be made. However, when the coating is made with a solution to which a compound containing hexavalent chromium such as chromic anhydride has been added, baking will be so difficult that, even after the baking, a part of the coating solution will remain on the surface to make the surface sticky.

The object of the present invention is to eliminate the above mentioned defect. The invention relates to a film producting composition and to the method wherein a material to be treated is painted on the surface with a solution prepared by adding 1 to 10% of a compound containing hexavalent chromium and 1 to 8% boric acid to a 5 to 40% aqueous solution of phosphoric acid by weight. The coated material is then heated at a temperature of 200 to 800° C. for 15 to 60 seconds to bake the coating.

Further, the present invention relates to a method for producing a film wherein a material to be treated is uniformly and thinly coated on the surface with a coating solution prepared by further suspending or dissolving in an aqueous solution of 1 to 10% of a compound containing hexavalent chromium 0.5 to 8% boric acid, and 5 to 40% phosphoric acid by weight (which aqueous solution shall be called the basic solution hereinafter) water glass ($\alpha = 1.4$) in an amount equivalent to not more than 20% by weight of said basic solution. Alternatively, to the basic solution there may be added one or more of silicic anhydride, magnesium oxide, calcium oxide and zinc oxide in an amount equivalent to not more than 10% by weight of said basic solution. The coated material is then heated at a temperature of 200 to 800° C. for 15 to 60 seconds to bake the coating.

It has been found that, even if the concentration of any of the above mentioned compounds is other than as specified above, a film will be produced. However, if the concentration of phosphoric acid is not more than 5%, the layer resistance and anticorrosiveness will not be sufficiently high. If it is more than 40%, the coating will become so thick that the space factor will reduce and the result will not be economical.

If a proper amount of a compound containing hexavalent chromium alone, such as chromic anhydride or potassium dichromate, is added to an aqueous solution of phosphoric acid, the film after heating will be higher in adhesiveness and space factor but will be sticky. This is deemed to be due to the inactivating action of the compound containing hexavalent chromium. Unreacted phosphoric acid will remain on the surface of the steel sheet. If boric acid is added, the stickiness of the film will be prevented. This is deemed to be due to reaction of the boric acid or borate with the phosphoric acid and chromium oxide dehydrated by heating so as to produce a glassy film. When the compound containing hexavalent chromium and the boric acid is less than the specified ranges, their effects will not be high enough. But when silicic anhydride, water glass or metal oxides is further added to the basic solution, the sufficient effects will be obtained even if the boric acid is less than the specified ranges (1-8%) but more than 0.5%. When they are more than the specified ranges, the surface will become coarse, the space factor will reduce, the result will not be economical and there will be a difficulty in the solubility of boric acid. Further a compound containing hexavalent chromium and boric acid is effective as stabilizer of the above-mentioned painting solution.

The material sheet is painted with the above mentioned coating solution and is heated at 200 to 800° C. for 15 to 60 seconds. If the temperature and time are less than these values, the film will be sticky. If they are more than these values, the steel sheet will be oxidized.

Even if phosphoric acid, chromic anhydride or boric acid is used individually, a film will be produced. However, a film produced by chromic anhydride alone is very low in the adhesiveness. That produced by boric acid alone is low in the electric resistance, is as crystalline as that produced by phosphoric acid and is likely to peel off in working. In the method of the present invention, the above mentioned defects are completely eliminated by using a coating solution prepared by mixing these three acids within fixed ranges as described above. When phosphoric acid and chromic anhydride are mixed, the space factor and adhesiveness will be improved. When boric acid is further added, the defect due to the inactivating action of chromic anhydride will be prevented and the adhesiveness will be improved. Thus a noncrystalline fine film will be produced.

When boric acid is added to a solution prepared by adding a compound containing hexavalent chromium to phosphoric acid as described above, the fact that a part of the solution will remain to make the surface sticky will be eliminated and a fine glassy insulating film will be obtained which will be excellent as an electrical insulating film. However, a method of further improving the layer resistance and heatproofness of the film shall be detailed in the following.

When a coating is made with a solution prepared by adding any one or more of water glass, silicic anhydride, magnesium oxide, calcium oxide and zinc oxide to the above mentioned aqueous solution consisting of phosphoric acid, a compound containing hexavalent chromium and boric acid, the layer resistance and heatproofness will be remarkably improved. If proper amounts of these compounds are added, the above mentioned features of the high adhesiveness and the fine surface will not be lost.

But, if the amount of water glass ($\alpha = 1.4$) to be added to the said basic solution exceeds the amount equivalent to 20% of said solution, the solution becomes unsuitable for coating, as it will be solidified and difficult to maintain a liquid state.

In adding silicic anhydride or a metal oxide such as magnesium oxide, calcium oxide or zinc oxide, if the amount of such compound to be added exceeds 10% of the basic solution, the surface of the steel sheet after baking will produce a powder and the space factor will become very low. The steel sheet is coated with the above mentioned solution and is then heated at a temperature of 200 to 800° C. for 15 to 60 seconds. If it is heated outside these ranges of the temperature and time, no film will be produced or the surface will be oxidized.

The present invention shall be explained in the following with reference to examples.

*Example 1*

A silicon steel sheet was coated on the surface with an aqueous solution of 20% phosphoric acid, 3% chromic anhydride and 3% boric acid by weight and was heated at 600° C. for 30 seconds. In this method, the coating was stable and the surface condition was excellent. That is to say, the coating could be made substantially without being influenced by the variation of the surface condition of the steel sheet, the variation of the amount of the coating solution, the variation of the temperature of the solution during the painting treatment and the time of dipping the steel sheet. Thus a fine surface film high in the space factor, anticorrosiveness and paint adhesiveness could be produced.

*Example 2*

A silicon steel sheet coated with a solution prepared by adding to an aqueous solution containing 20% phosphoric acid, 4.5% chromic anhydride and 2.5% boric acid by weight, magnesium oxide in an amount equivalent to 3.5% of said aqueous solution by weight and was heated at 600° C. for 30 seconds to bake the coating.

*Example 3*

A silicon steel sheet was uniformly thinly coated with a coating solution prepared by suspending 3% silicic anhydride in an aqueous solution containing 20% phosphoric acid, 3% chromic anhydride and 2.5% boric acid by weight and was heated at 600° C. for 30 seconds to bake the coating.

*Example 4*

A silicon steel sheet was coated uniformly and thinly with a solution prepared by adding 20% phosphoric acid and 2% boric acid by weight to an aqueous solution containing 5% chromic anhydride by weight and further adding 8% water glass ($\alpha=1.4$) by weight therein to and was heated at 600° C. for 30 seconds to bake the coating.

*Example 5*

A silicon steel sheet was coated with a solution prepared by adding 20% phosphoric acid, 1% boric acid, 2% calcium oxide and 2% magnesium oxide by weight to an aqueous solution containing 5% chromic anhydride by weight, and heated at 600° C. for 30 seconds to bake the coating.

*Example 6*

A silicon steel sheet was coated uniformly and thinly with a solution containing 20% phosphoric acid, 3% boric acid, 3% chromic anhydride and 3% zinc oxide by weight, and heated at 600° C. for 30 seconds to bake the coating. Coating with smooth surface was obtained.

*Example 7*

A silicon steel sheet was coated uniformly and thinly with a solution by adding 20% phosphoric acid and 3% boric acid by weight to an aqueous solution containing 3% chromic anhydride and further adding a powder of 2% silicic anhydride by weight thereinto, and heated at 600° C. for 30 seconds to bake the coating. Coating high in layer resistance was obtained.

In each of the above examples, a fine coating high in the layer resistance and heatproofness was obtained.

When the layer resistance of such steel sheet was measured by the A.S.T.M. No. 2 method, the results were as follows ($\Omega$-cm.$^2$/sheet).

In the case of Example 2:

|  | No. 1 | No. 2 | No. 3 |
| --- | --- | --- | --- |
| Minimum | 55 | 32 | 82 |
| Maximum | 3,200 | 150 | ∞ |

In the case of Example 3:

|  | No. 1 | No. 2 | No. 3 |
| --- | --- | --- | --- |
| Minimum | 22 | 34 | 43 |
| Maximum | 520 | 110 | 1,600 |

In the case of Example 4:

|  | No. 1 | No. 2 | No. 3 |
| --- | --- | --- | --- |
| Minimum | 29 | 30 | 65 |
| Maximum | 96 | 79 | 180 |

In the case of Example 5:

|  | No. 1 | No. 2 | No. 3 |
| --- | --- | --- | --- |
| Minimum | 80 | 65 | 40 |
| Maximum | 2,700 | 1,100 | 280 |

In the case of Example 6:

|  | No. 1 | No. 2 | No. 3 |
| --- | --- | --- | --- |
| Minimum | 38 | 47 | 18 |
| Maximum | 170 | 1,500 | 250 |

In the case of Example 7:

|  | No. 1 | No. 2 | No. 3 |
| --- | --- | --- | --- |
| Minimum | 45 | 69 | 100 |
| Maximum | 200 | 78 | 2,700 |

After such steel sheet was annealed at 800° C. for 4 hours in nitrogen gas containing 10% hydrogen gas, the values of the layer resistance were as follows ($\Omega$-cm.$^2$/sheet).

In the case of Example 2:

|  | No. 1 | No. 2 | No. 3 |
| --- | --- | --- | --- |
| Minimum | 47 | 37 | 65 |
| Maximum | 370 | 120 | 1,280 |

In the case of Example 3:

|  | No. 1 | No. 2 | No. 3 |
| --- | --- | --- | --- |
| Minimum | 10 | 21 | 17 |
| Maximum | 240 | 57 | 530 |

In the case of Example 4:

|  | No. 1 | No. 2 | No. 3 |
| --- | --- | --- | --- |
| Minimum | 17 | 20 | 35 |
| Maximum | 56 | 96 | 85 |

In the case of Example 5:

|  | No. 1 | No. 2 | No. 3 |
|---|---|---|---|
| Minimum | 50 | 70 | 55 |
| Maximum | 1,800 | 350 | 460 |

In the case of Example 6:

|  | No. 1 | No. 2 | No. 3 |
|---|---|---|---|
| Minimum | 26 | 43 | 13 |
| Maximum | 98 | 1,500 | 230 |

In the case of Example 7:

|  | No. 1 | No. 2 | No. 3 |
|---|---|---|---|
| Minimum | 21 | 38 | 56 |
| Maximum | 250 | 57 | 1,500 |

When the space factor was measured before and after the coating of such steel sheet, the results were as follows (in percent).

In the case of Example 2:

|  | Before | After |
|---|---|---|
| No. 1 | 96.7 | 96.5 |
| No. 2 | 97.3 | 97.1 |

In the case of Example 3:

|  | Before | After |
|---|---|---|
| No. 1 | 96.8 | 96.0 |
| No. 2 | 97.4 | 96.9 |

In the case of Example 4:

|  | Before | After |
|---|---|---|
| No. 1 | 97.3 | 97.4 |
| No. 2 | 98.1 | 97.8 |
| No. 3 | 97.7 | 98.1 |

In the case of Example 5:

|  | Before | After |
|---|---|---|
| No. 1 | 97.6 | 97.8 |
| No. 2 | 98.3 | 97.9 |
| No. 3 | 98.3 | 98.1 |

In the case of Example 6:

|  | Before | After |
|---|---|---|
| No. 1 | 97.6 | 98.1 |
| No. 2 | 97.8 | 98.1 |
| No. 3 | 98.0 | 97.9 |

In the case of Example 7:

|  | Before | After |
|---|---|---|
| No. 1 | 97.6 | 97.2 |
| No. 2 | 98.1 | 97.8 |
| No. 3 | 97.7 | 97.7 |

As a result of the experiments, it was found that the film was never affected by any transformer oil, trichlorethylene and Freon gas.

The film was so high in the adhesiveness that, even when the sheet was bent by 180 degrees with a radius of 2.5 cm., the film was not seen to peel off.

Though the present invention has been explained in the above with reference to silicon steel sheets, it is needless to say that the invention can also be applied to any other electrical sheets.

What we claim is:

1. A method for producing an insulating coating for silicon steel sheets which comprises uniformly thinly coating the surface of the steel sheet with an aqueous solution consisting essentially of from 5 to 40% by weight of phosphoric acid, from 1 to 10% by weight of a compound containing hexavalent chromium and from 1 to 8% by weight of boric acid and heating the sheet at a temperature of from 200 to 800° C. for from 15 to 60 seconds.

2. A method as in claim 1 wherein the coating solution consists essentially of an aqueous solution of from 5 to 40% by weight phosphoric acid, from 1 to 10% by weight of a compound containing hexavalent chromium and from 0.5 to 8% by weight of boric acid to which aqueous solution has been added, a member selected from the group consisting of magnesium oxide, calcium oxide, zinc oxide and mixtures thereof in an amount equivalent to not more than 10% by weight of said solution.

3. A method as in claim 1 wherein the coating solution consists essentially of an aqueous solution of from 5 to 40% by weight phosphoric acid, from 1 to 10% by weight of a compound containing hexavalent chromium and from 0.5 to 8% by weight of boric acid to which aqueous solution has been added water glass ($\alpha=1.4$) in an amount equivalent to not more than 20% by weight of said solution.

4. A method as in claim 1 wherein the coating solution consists essentially of an aqueous solution of from 5 to 40% by weight phosphoric acid, from 1 to 10% by weight of a compound containing hexavalent chromium and from 0.5 to 8% by weight of boric acid to which aqueous solution has been added a powder of silicic anhydride in an amount equivalent to not more than 10% by weight of said solution.

5. A composition for producing an insulating coating for silicon steel sheets, said composition consisting essentially of an aqueous solution of from 5 to 40% by weight phosphoric acid, from 1 to 10% by weight of a compound containing hexavalent chromium, and from 1 to 8% by weight of boric acid.

6. A composition for producing an insulating coating for silicon steel sheets, said composition consisting essentially of an aqueous solution of from 5 to 40% by weight phosphoric acid, from 1 to 10% by weight of a compound containing hexavalent chromium, from 0.5 to 8% by weight of boric acid, and up to 10% by weight of a member selected from the group consisting of magnesium oxide, calcium oxide, zinc oxide and mixtures thereof.

7. A composition for producing an insulating coating for silicon steel sheets, said composition consisting essentially of an aqueous solution of from 5 to 40% by weight phosphoric acid, from 1 to 10% by weight of a compound containing hexavalent chromium, from 0.5 to 8% by weight of boric acid, and up to 20% by weight of water glass ($\alpha=1.4$).

8. A composition for producing an insulating coating for silicon steel sheets, said composition consisting essentially of an aqueous solution of from 5 to 40% by weight phosphoric acid, from 1 to 10% by weight of a compound containing hexavalent chromium, from 0.5 to 8% by weight of boric acid, and up to 10% by weight of silicic anhydride.

9. A composition for producing an insulating coating for silicon sheets, said coating consisting essentially of an aqueous solution of about 20% by weight phosphoric acid, about 3% by weight chromic anhydride and about 3% by weight boric acid.

10. A composition for producing an insulating coating for silicon steel sheets, said coating consisting essentially of an aqueous solution of about 20% by weight phosphoric acid, about 4.5% by weight chromic anhydride, about 2.5% by weight boric acid, and about 3.5% by weight magnesium oxide.

11. A method for producing an insulating coating for silicon steel sheets which comprises uniformly thinly coating the surface of the steel sheet with an aqueous solution consisting essentially of about 20% by weight phosphoric acid, about 3% by weight chromic anhydride and about 3% by weight boric acid, and heating the sheet at a temperature of from 200° to 800° C. for from 15 to 60 seconds.

12. A method for producing an insulating coating for silicon steel sheets which comprises uniformly thinly coating the surface of the steel sheet with an aqueous solution consisting essentially of about 20% by weight phosphoric acid, about 4.5% by weight chromic anhydride, about 2.5% by weight boric acid, and about 3.5% by weight magnesium oxide and heating the sheet at a temperature of from 200° to 800° C. for from 15 to 60 seconds.

References Cited by the Examiner

UNITED STATES PATENTS

| 1,946,146 | 2/34 | Kiefer et al. | 117—129 |
| 2,056,386 | 10/36 | Cambron | 117—127 |
| 2,296,884 | 9/42 | Thompson | 117—127 |
| 2,484,242 | 10/49 | Nagel et al. | 148—6.16 |
| 2,859,147 | 11/58 | Jeremias | 148—6.16 |
| 2,967,791 | 1/61 | Halversen | 148—6.16 |
| 3,097,978 | 7/63 | Newell et al. | 148—6.16 |

FOREIGN PATENTS 298,328   10/28   Great Britain.

RCHARD D. NEVIUS, *Primary Examiner.*